(12) United States Patent
Halling

(10) Patent No.: US 6,612,030 B2
(45) Date of Patent: Sep. 2, 2003

(54) MULTIPLE-PLY RESILIENT SEAL

(75) Inventor: Horace P. Halling, Durham, CT (US)

(73) Assignee: Jetseal, Inc., Spokane, WA (US)

( * ) Notice: Subject to any disclaimer, the term of this patent is extended or adjusted under 35 U.S.C. 154(b) by 0 days.

(21) Appl. No.: 09/968,889

(22) Filed: Oct. 3, 2001

(65) Prior Publication Data

US 2002/0050690 A1 May 2, 2002

Related U.S. Application Data

(63) Continuation of application No. 09/265,887, filed on Mar. 11, 1999, now Pat. No. 6,318,736.

(51) Int. Cl.⁷ .............................................. B23P 15/00

(52) U.S. Cl. ...................... 29/888.3; 277/922; 277/924; 72/369; 72/370

(58) Field of Search ........................... 29/888.3; 72/369, 72/370, 370.21, 370.23; 277/922, 924, 617, 530, 644, 626, 647, 603, 608, 613, 614, 615, 631, 635, 648, 651, 654; 228/141.1, 144, 150, 151, 164, 169

(56) References Cited

U.S. PATENT DOCUMENTS

| | | | |
|---|---|---|---|
| 685,610 A | 10/1901 | Huhn | 277/603 |
| 961,872 A | 6/1910 | Lutz et al. | |
| 1,052,462 A * | 2/1913 | Gustafson | 277/530 |
| 1,331,253 A * | 2/1920 | Gates | 277/541 |
| 1,372,529 A * | 3/1921 | Mastin | 428/126 |
| 1,609,283 A | 12/1926 | Baily | |
| 1,779,548 A | 7/1930 | Oven | |
| 1,789,595 A | 1/1931 | Oven | |
| 2,071,825 A * | 2/1937 | Finlayson | 277/530 |
| 2,255,504 A * | 9/1941 | Current | 156/193 |
| 2,315,588 A | 4/1943 | Brickman | 94/18 |
| 2,459,720 A | 1/1949 | Poltorak | 288/33 |
| 2,569,778 A | 10/1951 | Phillips | 277/603 |
| 2,838,328 A | 6/1958 | Rohrberg | 288/14 |
| 3,091,025 A * | 5/1963 | Zallea | 228/170 |
| 3,171,661 A * | 3/1965 | Blair | 277/530 |
| 3,180,662 A | 4/1965 | Parlasca et al. | 277/608 |
| 3,272,521 A | 9/1966 | McNenny | 277/603 |
| 3,325,892 A * | 6/1967 | Delgodo et al. | 228/129 |
| 3,352,006 A | 11/1967 | Satoh et al. | 29/512 |
| 3,451,696 A * | 6/1969 | Hagelin | 285/21.1 |
| 3,490,131 A * | 1/1970 | Sexton | 29/402.02 |
| 3,554,567 A | 1/1971 | Carroll et al. | 277/164 |
| 3,572,735 A | 3/1971 | Dryer | 277/235 |
| 3,761,102 A | 9/1973 | Nicholson | 277/236 |
| 3,879,043 A | 4/1975 | Tozer | 277/163 |
| 3,940,152 A | 2/1976 | Fournier | 277/34 |
| 4,114,245 A * | 9/1978 | Bainard | 29/527.1 |
| 4,218,067 A * | 8/1980 | Halling | 277/605 |
| 4,316,348 A | 2/1982 | Adell | |
| 4,561,662 A | 12/1985 | de Villepoix et al. | 277/229 |
| 4,585,239 A | 4/1986 | Nicholson | |
| 4,602,795 A | 7/1986 | Lillibridge | 277/236 |
| 4,744,572 A | 5/1988 | Sahba et al. | 277/236 |
| 4,759,555 A * | 7/1988 | Halling | 277/631 |
| 5,022,663 A | 6/1991 | Fages et al. | 277/236 |
| 5,125,796 A | 6/1992 | Cromer | 415/174.2 |
| 5,240,263 A | 8/1993 | Nicholson | 277/236 |
| 5,249,814 A * | 10/1993 | Halling | 277/654 |
| 5,294,135 A * | 3/1994 | Kubouchi et al. | 277/595 |
| 5,433,370 A * | 7/1995 | Halling | 228/155 |

(List continued on next page.)

Primary Examiner—Sharon N. Thornton
Assistant Examiner—I Cuda-Rosenbaum
(74) Attorney, Agent, or Firm—Baker & Hostetler LLP

(57) ABSTRACT

A seal features a first curved region generally concave in a direction of concavity, and a second curved region generally concave in the direction of the concavity of the first curved region. The second curved region is oriented within the direction of concavity of the first curved region. A first bend connects the first curved region to the second curved region, and a second bend connects the first curved region to the second curved region.

18 Claims, 6 Drawing Sheets

U.S. PATENT DOCUMENTS

| | | | |
|---|---|---|---|
| 5,505,498 A | 4/1996 | Halling et al. | 285/111 |
| 5,533,736 A | 7/1996 | Yamaga | 277/79 |
| 5,630,593 A | 5/1997 | Swensen et al. | 277/206 R |
| 5,669,612 A | 9/1997 | Nicholson | 277/167.5 |
| 5,716,052 A | 2/1998 | Swensen et al. | 277/27 |
| 6,257,594 B1 * | 7/2001 | Halling et al. | 277/644 |
| 6,302,402 B1 * | 10/2001 | Rynders et al. | 277/530 |
| 6,363,610 B1 * | 4/2002 | Narasimhan et al. | 29/888.3 |

* cited by examiner

MULTIPLE-PLY RESILIENT SEAL

This application is a continuation of U.S. application Ser. No. 09/265,887, filed Mar. 11, 1999, now allowed now U.S. Pat. No. 6,318,736.

FIELD OF INVENTION

The invention relates to a resilient seal.

BACKGROUND OF INVENTION

Resilient seals of basic C-shaped cross-section are known and used in numerous applications. However, there can be some drawbacks to the basic C-shaped type of seal. For example, in certain circumstances where it is desired to obtain virtual hermetic sealing, in which leakage rates are lower than 1E-9 mb-l/s, a basic C-shaped seal may have limitations on re-use or repositioning due to low springback, and may lack the ability to achieve the desired combination of acceptable springback and high sealing force. The importance of springback and the maintenance of sealing force are significant in such environments as elevated temperature sealing of relatively flexible pressure containment structures, because, for example, at operating pressures and temperatures, a joint sealed by a resilient seal will usually experience a widening of the distance between its sealing faces.

Various solutions have been developed to achieve high springback and sealing force. For example, a basic C-shaped cross-section seal may be reinforced by a secondary element, such as, for example, a C-shaped seal having a helically-wound, toroidal "garter" spring nested inside the C-shaped cross-section of the seal as disclosed in U.S. Pat. No. 5,022,663. Another disclosure for achieving high springback and sealing force employs the use of multiple-ply C-shaped cross-section seals as disclosed in U.S. Pat. No. 4,218,067. Yet another disclosure for achieving high springback and reduced sealing force is disclosed U.S. patent application Ser. No. 09/228,292, filed Jan. 11, 1999, entitled Resilient Sealing Ring, in the names of Horace P. Halling and Paul L. Porter.

Also, some types of seals, including some discussed above having reinforcement features, suffer from the disadvantage that they manifest a tendency to retain the fluids they are sealing. For example, they tend to retain viscous fluids and plating solutions. An example of fluid retention occurs when the fluid under high pressure enters the channel formed by the concave central area of the C-shape and penetrates between the coils of a garter spring. When the pressure is reduced, some fluid remains within the close-coiled spring inside the channel inside the C-shape even after the fluid chamber being sealed has otherwise been evacuated or emptied. For example, entrapment of fluids in the channel inside the reinforced C-shape may occur during plating operations at the time of seal manufacture or during operation of the seal. The fluids may become entrapped in the reentrant channel inside the reinforced C-shape due to capillary attraction or due to the viscosity of the fluid. Accordingly, these seals require effective masking if fluid retention is to be avoided.

SUMMARY OF INVENTION

In one application, the invention provides a pressure-energized resilient seal that may be suitable for high-pressure and/or high-temperature containment of fluids in which virtually hermetic sealing may be accomplished, combined with the ability to maintain sealing efficiency while mating sealing members undergo separating deflections. In such an environment, the invention provides a seal having desirable sealing force and springback characteristics, while mitigating or preventing the occurrence of fluid entrapment within the seal. In yet another aspect, an example of the invention provides a seal featuring a first curved region having a cross-section generally concave in a direction of concavity, and a second curved region having a cross-section generally concave in the direction of the concavity of the first curved region. The convex surface of the second curved region is generally proximal to the generally concave surface of the first curved region. A first bend connects the first curved region to the second curved region, and a second bend connects the first curved region to the second curved region.

DETAILED DESCRIPTION OF THE PREFERRED EMBODIMENTS

Figure 1A:
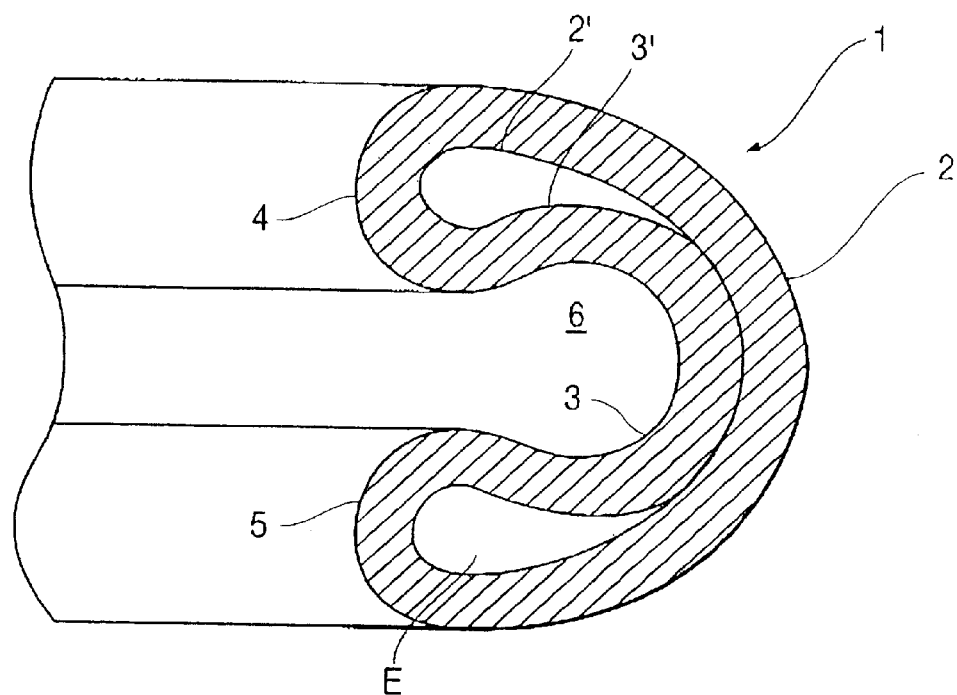
FIG. 1A is a side sectional cutaway view of a seal according to a preferred embodiment.

Referring now to a preferred embodiment of the invention depicted in FIG. 1A, a seal 1 embodies an annulus of generally concave cross-section, the curved portions of which have at least two plies being disposed, more or less, adjacent to each other. As shown in FIG. 1A the seal 1 features an annular first curved region 2 (including an outer surface of the seal) having a generally concave cross-section, generally concave in a first direction of concavity, and an annular second curved region 3 (including an inner surface of the seal) having a cross-section with a concavity 6 generally concave in the direction of the concavity of the first curved region 2. In this embodiment, the second curved region 3 has a smaller radius of curvature than the first curved region 2 and the convex surface of the second curved region 3 is generally proximal to the generally concave surface of the first curved region 2, as shown. A first acute bend 4 connects the first curved region 2 to the second curved region 3 at the regions' topmost adjacent edges, and a second acute bend 5 connects the first curved region 2 to the second curved region 3 at the regions' bottommost adjacent edges.

In the embodiment illustrated herein, the first curved region 2 and second curved region 3 are depicted having arcuate profiles. The profiles of these portions may be any curved, or compound curved shape, e.g., a partial circle or a partial ellipse.

Figure 8:
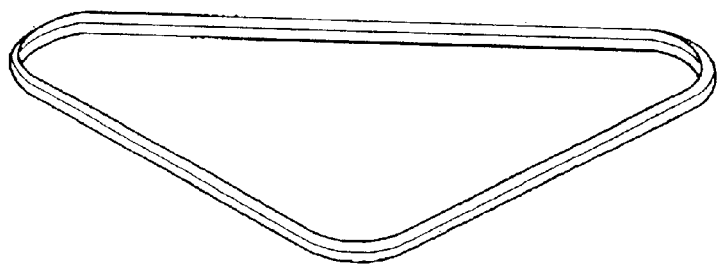
FIG. 8 illustrates an isometric depiction of a non-circular seal.

The invention provides an improved seal. It will be readily apparent to one of ordinary skill in the art that the term seal, as used herein, may refer to any number of shapes whose planform (the contour of an object as viewed from above) outline may, for example, be in the shape of an annulus (e.g., a circular ring), or in the shape of a curvilinear figure, or in the shape of a polygonal figure; where the vertices of any figure forming a seal are arcuate in shape. An example of a non-circular embodiment of the invention disclosed herein is illustrated in FIG. 8.

The first preferred embodiment 1, shown in FIG. 1A, may be produced from a single piece of tube stock, such as precision metal tube stock, formed into a two ply (two layer) cross-section as shown in FIG. 1A. The tube stock is formed into a partial circle, in which the two ends remain straight and are brought into general juxtaposition, so that the ends, which have been previously squared and prepared, may be butt-welded together using an autogenous T.I.G. or other suitable welding process. The weld is then roll-planished about its circumference, to reduce its bead height and cold-forge the re-cast structure, before the seal is roll-formed into a radially flattened toroidal shape. Subsequent operations progressively modify the cross-section of the seal until it adopts the shape shown in FIG. 1A. In this preferred embodiment, this shape forms an enclosed volume E at each acute bend. A radially outer surface 3' at the second curved region may be adjacent to, or as shown, in contact with, a radially inner surface 2' of the first curved region.

During welding a very small section on the inside surface of the seal is left unwelded, to permit air which would otherwise be trapped inside to escape rather than increase in pressure as the inside volume of the seal is reduced. This unwelded section is located in a wall which is subject only to compressive stress in service and may be sealed, by completing the weld, before final forming.

The seal thus formed is heated treated and has its outer convex surface improved to an appropriate surface finish and shape (e.g., a virtually perfect surface of revolution) by the application of an abrasive machining process similar to grinding. A surface of revolution is used here to refer to the shape of a body generated when a defined curve or spline is rotated about an axis held motionless in space. Every element on the surface of an infinitely thin slice of a radial plane section of the body generating an elemental circle when rotated about an axis contained in such plane. Each element of said plane section of the body being bounded by an elemental circle concentric with all others about said axis. Of course, the invention can include surface shapes and finishes that do not form a surface of revolution as defined above.

Figure 1B:
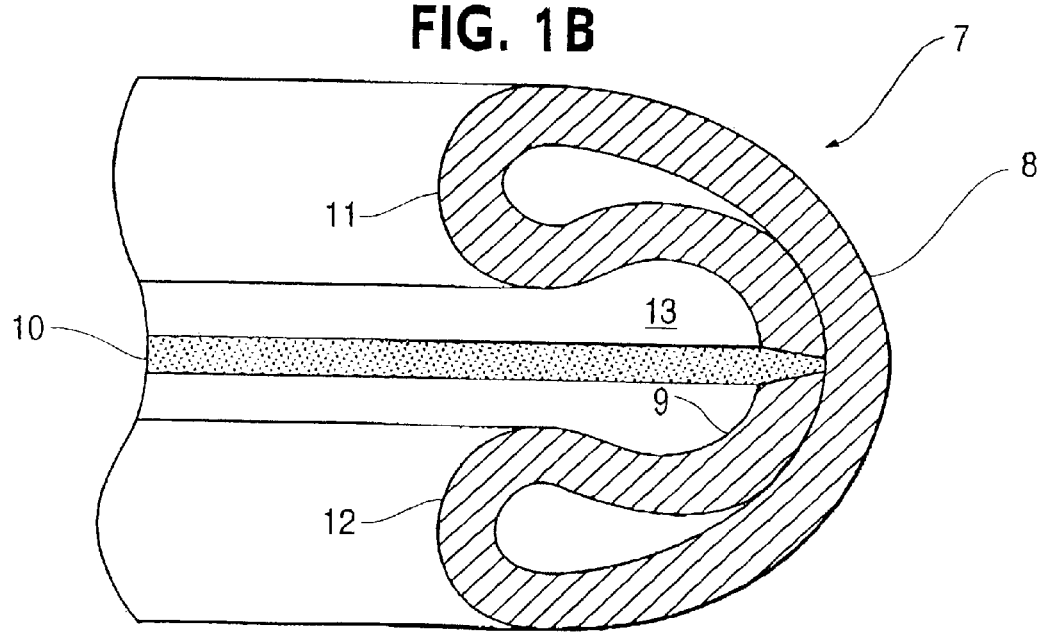
FIG. 1B is a side sectional cutaway view of a seal according to a second preferred embodiment.

A second embodiment of the present invention is depicted in FIG. 1B. The raw material for this embodiment may be, for example, a single piece of strip stock, such as of precision metal or other suitable material, the thickness of which is controlled to within 3 percent of its nominal value and width of which is within ±0.002 inches. This second embodiment of the seal 7 may be produced by a method which includes a full circumferential butt-weld 10. As shown in FIG. 1B, the seal 7 features an annular first curved region 8 (including an outer surface of the seal) having a cross-section, generally concave in a first direction of concavity, and an annular second curved region 9 (including an inner surface of the seal) having a cross-section with a concavity 13 generally concave in the direction of the concavity of the first curved region 8. The second curved region 9 has a smaller radius of curvature than the first curved region 8 and the convex surface of the second curved region 9 is generally proximal to the generally concave surface of the first curved region 8, as shown. A first acute bend 11 connects the first curved region 8 to the second curved region 9 at the regions' topmost adjacent edges, and a second acute bend 12 connects the first curved region 8 to the second curved region 9 at the regions' bottommost adjacent edges. A circumferential butt-weld 10 forms a seam about a circumference of the seal within the concavity 13 of the generally concave central area of the seal.

The weld 10 in the FIG. 1B embodiment 7 generally cannot be planished, except by the action of rolling during forming. Fortunately, however, the level of tensile stress transverse to the weld run (in the meridional plane) is reduced by the arrangement of the two plies connected at their ends, which results in mainly compressive stresses at the weld in the member on the inside of the bend in the meridional plane. In the circumferential direction, the stress is relatively low.

The second embodiment 7 may also be heat treated and its outer contour may preferably be improved to a virtually perfect surface of revolution by the application of an abrasive machining process similar to grinding. Of course, the invention can include surface shapes and finishes that do not form a surface of revolution as defined above.

Figure 1C:
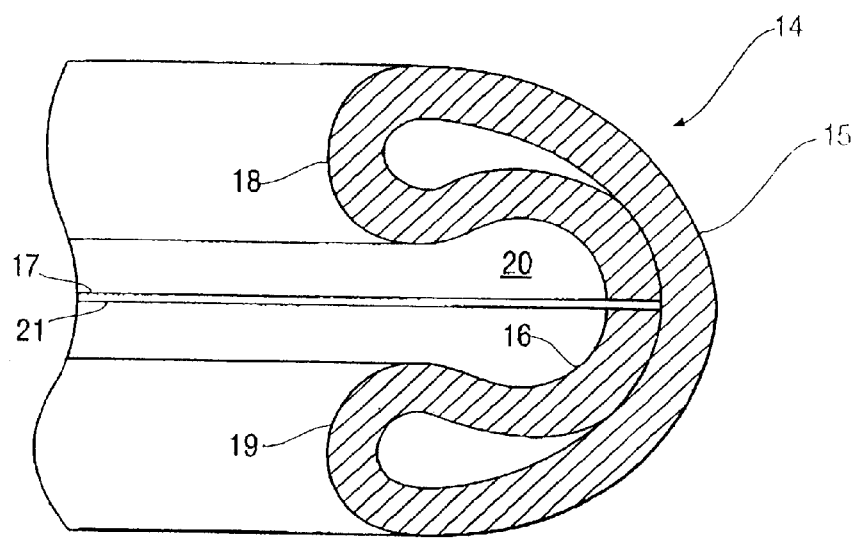
FIG. 1C is a side sectional cutaway view of a seal according to a third preferred embodiment.

A third embodiment of the present invention is illustrated in FIG. 1C. This embodiment 14 may be formed from strip stock, such as precision metal strip stock, arranged so that the edges 17 and 21 of the strip are in general juxtaposition at a circumference substantially along the line of symmetry between the topmost portion of the seal cross-section and the bottommost portion of the seal cross-section. The edges 17 and 21, thus running circumferentially about the concavity 20 formed within the second curved region 16, remain unwelded. As shown in FIG. 1C, the seal 14 features an annular first curved region 15 (including an outer surface of the seal) having a cross-section, generally concave in a first direction of concavity, and an annular second curved region 16 (including an inner surface of the seal) having a cross-section with a concavity 20 generally concave in the direction of the concavity of the first curved region 15. The second curved region 16 has a smaller radius of curvature than the first curved region 15 and the convex surface of the second curved region 16 is generally proximal to the generally concave surface of the first curved region 15, as shown. A first acute bend 18 connects the first curved region 15 to the second curved region 16 at the regions' topmost adjacent edges, and a second acute bend 19 connects the first curved region 15 to the second curved region 16 at the regions' bottommost adjacent edges. An unwelded seam is formed at the juxtaposition of edges 17 and 21 along the circumference of the second curved region 16. This embodiment 14 has the similar advantages of high springback and increased sealing force, compared to prior art seals, but may be limited to the pressure that can be safely carried by one ply of the strip stock material used to make the seal.

The third embodiment 14 may also be heat treated and its outer contour may be improved to a virtually perfect surface of revolution by the application of an abrasive machining process similar to grinding. Of course, the invention can include surface shapes and finishes that do not form a surface of revolution as defined above.

Figure 7:
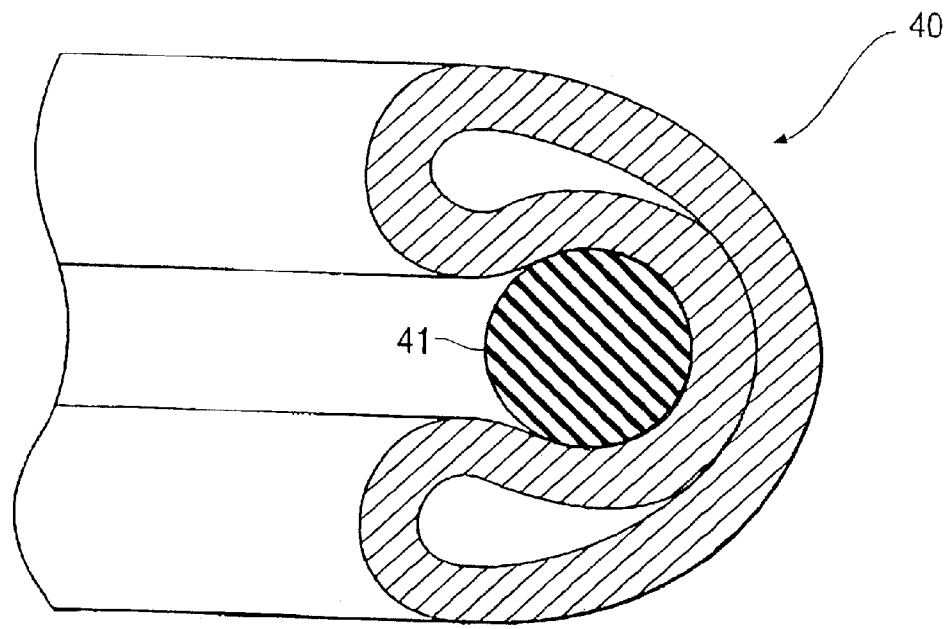
FIG. 7 is a side sectional cutaway view of a seal according to the current invention, with a resilient material of circular cross-section installed within the channel formed by the generally concave central area of the seal.

A potential advantage of the embodiment of the invention as shown in FIG. 1C, is that it may have reduced manufacturing cost when compared to other embodiments, such as those depicted in FIGS. 1A and 1B. During plating of this alternate embodiment, a suitable resilient material of circular cross-section may be force-fit into the concavity 20 to exclude plating solution from penetrating between the innermost ply 16 and the outermost ply 15. FIG. 7 depicts, in a side sectional cutaway view, a seal 40 according to the current invention, with a resilient material of circular cross-section 41 installed within the channel formed by the generally concave central area of the seal.

Figure 2A:
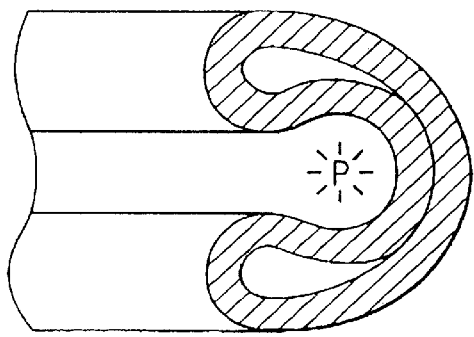
FIG. 2A is a side sectional cutaway view of an embodiment, showing the seal in an internal pressure application.
Figure 2B:
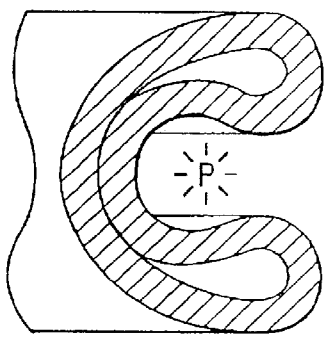
FIG. 2B is a side sectional cutaway view of an embodiment, showing the seal in an external pressure application.
Figure 2C:
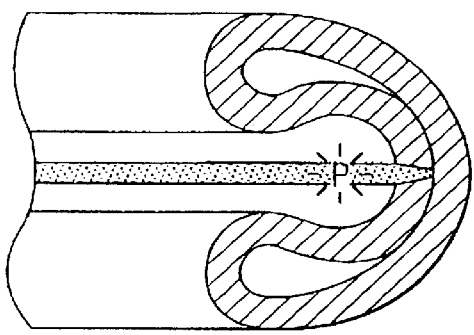
FIG. 2C is a side sectional cutaway view of an embodiment, showing the seal in an internal pressure application.
Figure 2D:
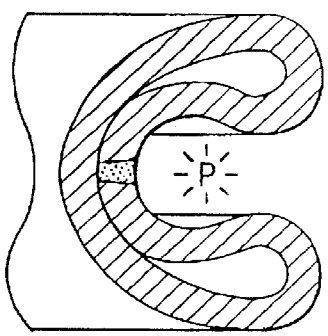
FIG. 2D is a side sectional cutaway view of an embodiment, showing the seal in an external pressure application.
Figure 2E:
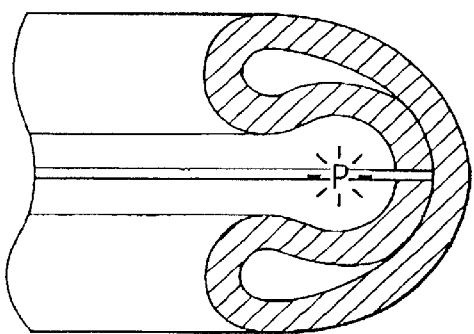
FIG. 2E is a side sectional cutaway view of an embodiment, showing the seal in an internal pressure application.
Figure 2F:
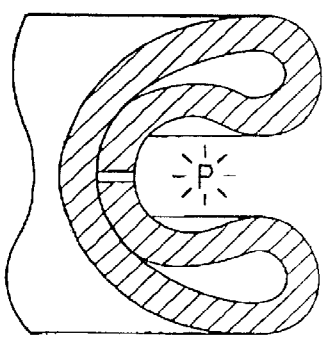
FIG. 2F is a side sectional cutaway view of an embodiment, showing the seal in an external pressure application.

FIGS. 2A, 2B, 2C, 2D, 2E, and 2F are side sectional cutaway views of examples of seals according to the present invention, showing seals used in both internal and external pressure applications. FIGS. 2A, 2C, and 2E illustrate the geometry for seals used in applications where the highest operating pressure will be encountered within the center of the geometric circle which circumscribes the seal (internal pressure type seals). FIGS. 2B, 2D, and 2F illustrate the geometry used for seals in applications where the highest operating pressure will be encountered outside of the center of the geometric circle which circumscribes the seal (external pressure type seals). The area of highest operating pressure is indicated in each of the figures by the letter "P" surrounded by outwardly pointing arrows. The greater pressure must, of course, act inside the generally concave side of the seal cross-section in order to energize the seal outwardly, so that higher contact forces are generated as the pressure increases. If the greater pressure were to act on the convex side of the seal cross-section, leakage would likely occur as soon as the spring force of the compressed seal was equalized or overcome by a resultant of the force produced by the differential pressure acting over the surface of the seal.

Figure 3A:
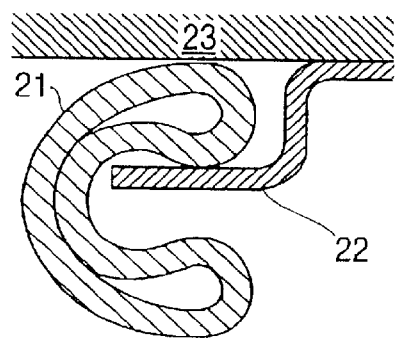
FIG. 3A is a cross-sectional view of a seal according to a preferred embodiment, before compression, when mounted on hanger brackets on a pressure vessel cover in which the axis of the seal is vertical.
Figure 3B:
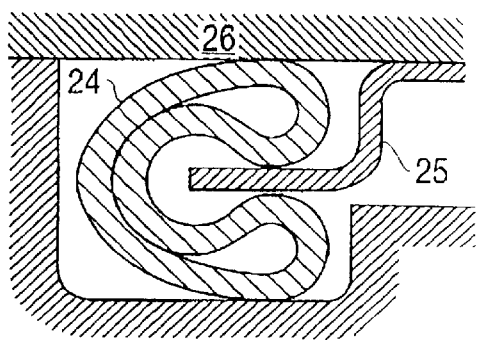
FIG. 3B is a cross-sectional view of a seal according to a preferred embodiment, after compression, when mounted on hanger brackets on a pressure vessel cover in which the axis of the seal is vertical.

FIG. 3A depicts an example of a seal of the present invention 21, before compression, when mounted on hanger brackets 22 on a pressure vessel cover 23 in which the axis of the seal is vertical. FIG. 3B depicts a seal of the present invention 24, after compression, when mounted on hanger brackets 25 on a pressure vessel cover 26 in which the axis of the seal is vertical. This embodiment of the seal requires no special features, other than the hanger brackets 22 or 25, to ensure its proper location.

Figure 4A:
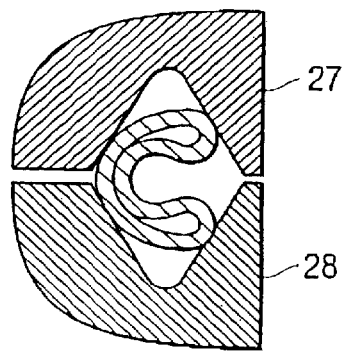
FIG. 4A depicts a seal according to a preferred embodiment, installed in opposing V-grooves, before compression.
Figure 4B:
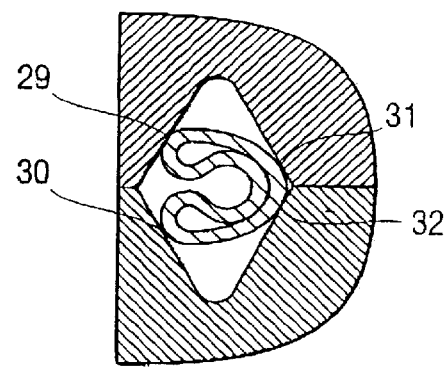
FIG. 4B depicts a seal according to a preferred embodiment, installed in opposing V-grooves, after compression.
Figure 5A:
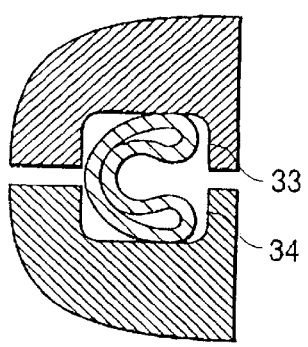
FIG. 5A depicts a seal according to a preferred embodiment, installed in a rectangular cavity groove, before compression.
Figure 5B:
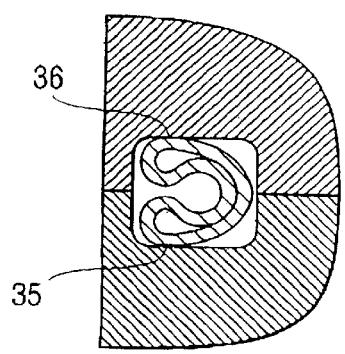
FIG. 5B depicts a seal according to a preferred embodiment, installed in a rectangular cavity groove, after compression.

FIG. 4A depicts an example of a seal of the present invention, installed in opposing V-groove joints 27 and 28, before compression. FIG. 4B illustrates that in this application, after compression, the seal has four lines of sealing contact 29, 30, 31, and 32. FIG. 5A depicts an example of a seal of the present invention, before compression, installed in a traditional rectangular cavity groove comprised of a top channel 33 and a bottom channel 34. FIG. 5B also illustrates the sealing points of contact between the seal and the faces of the rectangular cavity groove. FIG. 5B illustrates that in this application, after compression, the seal has two lines of sealing contact 35 and 36.

Figure 6:
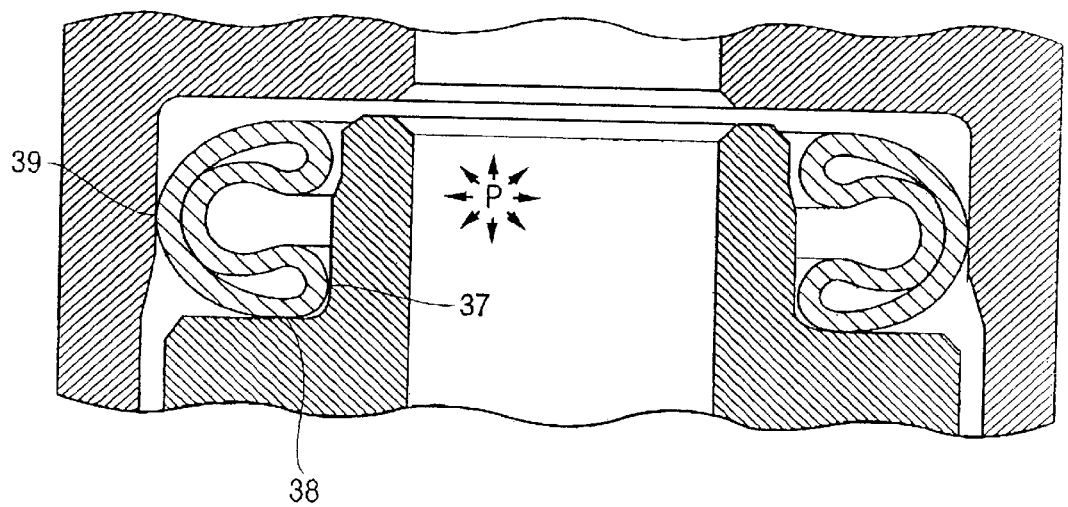
FIG. 6 is a cross-sectional view of a seal according to the preferred embodiment, employed in a coaxial application.

FIG. 6 illustrates yet another use of an example of a seal of the present invention. FIG. 6 also illustrates the sealing points of contact between the seal and the surfaces of the groove formed between the coaxial sealing members. In this illustration, at least two lines of sealing contact 37 and 39 are established on essentially coaxial walls, which form co-operating members of the sealing joint. Such an arrangement is preferable when very large axial tolerance accumulations result in excessive variability of the "groove" axial length, thereby exceeding the resilient capacity of face type seals, such as that shown in FIG. 1. This arrangement may also permit small cyclic axial displacements between the two co-operating members; depending on the possibilities of the use of lubrication or a suitable coating.

The seals in the preferred embodiments above are preferably formed of metal, such as a nickel-base metal alloy, but may be alternatively formed of any suitable material without departing from the invention.

Seals provided by the present invention may be used for containing fluids at elevated pressures and/or temperatures, where high deflection capability is needed. Examples of seals made according to the present invention provide desirable springback while reducing or eliminating fluid entrapment problems, and in some instances, doubling the available sealing force compared to prior art basic C-shaped seals. Examples of seals of the present invention may be used in situations where it is desirable to reduce or avoid entrapment of fluids in the reentrant channel of the seal, such as applications that require the minimization or exclusion of contaminants in the system or machine in which the seal operates, or where the system or machine in which the seal operates requires a series of fluids of distinct characteristics to be passed through the sealed area. They are particularly suited for seals that are required to be plated and for those employed in applications where fluid changes demand the minimization of fluid carry-over, such as in the process of polymer production where changes in polymer type or color occur.

Examples of seals made according to the present invention exhibit high resilience and flexibility and are exceptionally suitable in many applications, such as, for example, re-use and for sealing hand re-worked variable depth grooves during ineluctable on-site maintenance and repair. Seals of the present invention may be especially advantageous in many applications such as, by way of example only, multiple-fluid processing systems and nuclear pressure vessel closures.

A further advantage of some seals made according to the present invention resides in the reinforcement, provided by the doubling of said seals' cross-sectional area, against radial displacement of the seal. This provides an advantage compared to the employment of a single-ply seal of thicker material, which would result in lower springback and higher internal stresses.

While various embodiments have been described to illustrate the present invention, it will be understood by those skilled in the art that various modifications and changes can be made therein without departing from the scope of the invention as defined in the appended claims.

What is claimed is:

1. A method of forming a seal, comprising the steps of:
    shaping a piece of tube stock having a first end and a second end into a two-ply cross section;
    bending the piece of tube stock such that the ends are abutting; and
    joining the ends together.

2. The method according to claim 1, wherein the ends are joined together using a welding process to form a weld.

3. The method according to claim 2, wherein the welding process is T.I.G. welding.

4. The method according to claim 2, further comprising the steps of:
    reducing the bead height of the weld; and
    cold-forging the piece of tube stock.

5. The method according to claim 4, further comprising the step of roll-forming the piece of tube stock into a radially flatened toroidal shape.

6. The method according to claim 5, further comprising the steps of:
    heat treating the tube stock; and
    shaping and finishing the outer surface of the tube stock.

7. A method for forming a seal, comprising the steps of:
    shaping a portion of strip stock having a first end and a second end and a first lengthwise edge and a second lengthwise edge into a two-layer cross section wherein the first and second lengthwise edges substantially abut each other;
    joining the lengthwise edges to each other; and
    joining the first end to the second end.

8. The method according to claim 7, wherein the lengthwise edges are joined to each other by a continuous weld.

9. The method according to claim 7, wherein the ends are joined together by a welding process.

10. The method according to claim 9, wherein the welding process is a butt-weld.

11. The method according to claim 10, further comprising the step of reducing the bead height of the weld.

12. The method according to claim 11, further comprising the steps of:
    heat treating the strip stock portion; and
    finishing the outer surface of strip stock portion.

13. A method for forming a seal, comprising the steps of:
    shaping a piece of strip stock having a first end and second end and a first lengthwise edge and a second lengthwise edge to form a two-layer cross section wherein a seam extends between the two layers of the cross section;
    bending the strip stock portion such that the ends are generally positioned adjacent to one another;
    joining the first lengthwise edge and the second lengthwise edge together; and
    joining the ends to one another.

14. The method according to claim 13, wherein the lengthwise edges are joined together by a welding process.

15. The method according to claim 14, wherein the welding process is T.I.G. welding.

16. The method according to claim 14, wherein the ends are joined together by a welding process.

17. The according to claim 16, wherein the welding process is butt-weld.

18. The method according to claim 13, further comprising the steps of:
    heat treating the strip stock portion; and
    finishing the outer surface of the strip stock portion.

* * * * *